Figure 1:
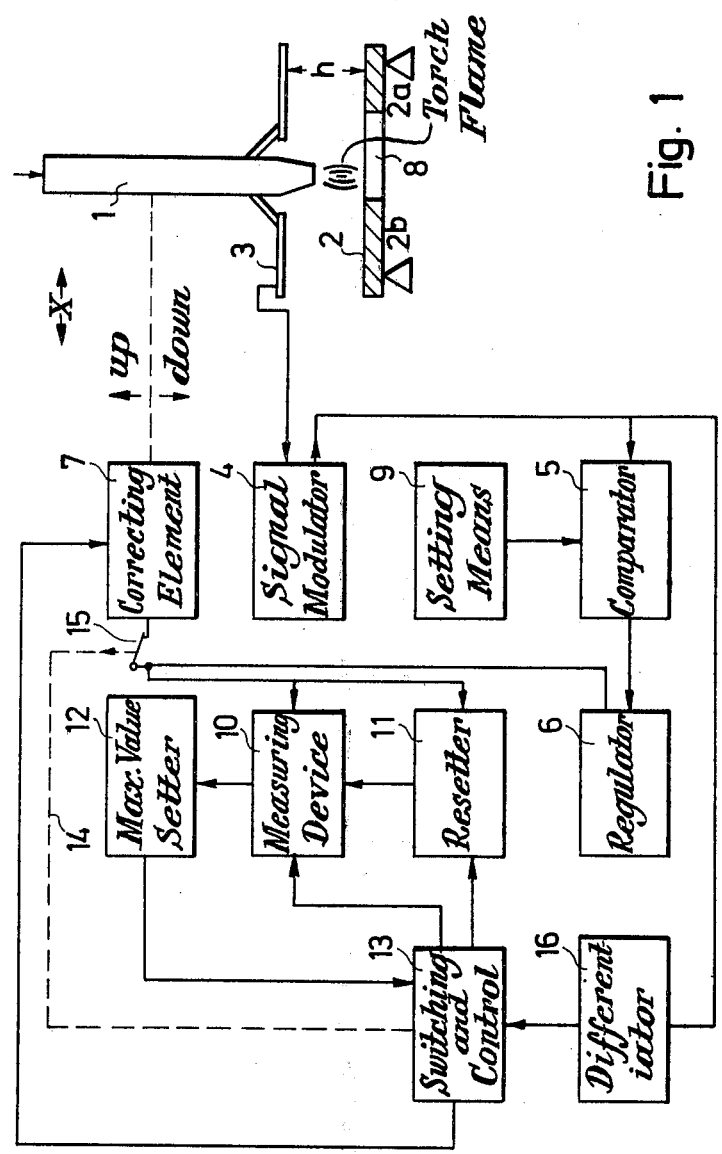

United States Patent [19]

Schmall

[11] 3,928,790
[45] Dec. 23, 1975

[54] REGULATING PROCESS AND DEVICE

[75] Inventor: Karl Heinz Schmall, Baden-Baden, Germany

[73] Assignee: Precitec GmbH, Baden-Baden, Germany

[22] Filed: June 11, 1974

[21] Appl. No.: 478,278

[30] Foreign Application Priority Data
June 16, 1973 Germany.............................. 2330782

[52] U.S. Cl...................................... 318/286; 148/9
[51] Int. Cl.²...................... B23Q 17/18; G05D 3/04
[58] Field of Search ............. 318/39, 265, 380, 381, 318/382, 383, 386; 148/9

[56] References Cited
UNITED STATES PATENTS

| | | | |
|---|---|---|---|
| 2,534,958 | 12/1950 | Deming............................ | 318/286 X |
| 2,747,152 | 5/1956 | Greene ............................... | 318/286 |
| 3,203,683 | 8/1965 | Weiler ............................ | 318/286 X |
| 3,755,005 | 8/1973 | Hayasaki et al. ........................ | 148/9 |

*Primary Examiner*—Robert K. Schaefer
*Assistant Examiner*—W. E. Duncanson, Jr.
*Attorney, Agent, or Firm*—Connolly and Hutz

[57] ABSTRACT

In a device for maintaining a constant distance between a tool and the surface of a workpiece, the tool distance is determined by a sensing element and compared with a desired distance. The resultant error signal is used to correct the deviation. When the tool is moved toward the workpiece, the total movement is compared to a predetermined maximum. If the predetermined maximum is exceded, the tool is moved away from the work piece to this position and maintained until the sensing element senses a decrease of the distance between the tool and the workpiece.

11 Claims, 3 Drawing Figures

REGULATING PROCESS AND DEVICE

The invention relates to a regulating process and a device for maintaining constant the distance of a tool from the surface of a work piece to be processed having an uneven surface over which the tool is moved parallel to the surface, particularly for the distance regulation of the torch of a torch-cutting device for metal plates from the work piece, the tool distance being determined by a sensing element, compared with the desired factor and the thus determined deviation fed to a regulator, which in turn, depending on this, emits regulating signals to a correcting element, which shifts the tool toward the work piece or away from the work piece depending on the direction of the deviation. Such processes present a special problem in that the tool often must be conducted over recesses in the material or over the interstice between two adjacent work pieces. The sensing element, which during the advance movement parallel to the work piece must provide for a constant distance between tool and work piece, at such recesses or at edges causes a presumed approach movement of the tool and thus causing the tool to be moved deep into the recesses. This presumed approach movement at edges and in recesses or pits would have continued practically to the point until the tool hit the support situated under the work piece or adjacent to the work piece. In order to avoid this and the consequent damage, there has been provided in the known torch-cutting devices that the torch, as soon as it has achieved a set depth factor, is automatically moved away from the work piece and is stopped in an end position above. In this instance, the control of the torch over an edge or a recess in the work piece must be undertaken manually. A fully automatic operation, e.g. for the cutting of steel plates with holes or along edges, however, in the known processes and devices is possible only by engaging the positioning or path control per program or also manually.

The object of the invention is to avoid the disadvantages of the known processes, particularly also to provide a process and a device for maintaining constant the distance of a tool from the surface of a work piece to be processed, wherein the distance to the imaginary surface is maintained in the area of the recess even over recesses and at edges at which no material can be determined under the work piece by the sensing element of the automatic control system without thereby setting too rigidly or limiting the programming of the course of burning.

According to the invention, this object is solved primarily in that in the initiation of a movement of the correcting element directed toward the work piece, the course of the tool in response to the correcting element is determined and quantitatively accumulated; that the accumulated value is again cleared as soon as the correcting element comes to rest by means of the regulation or the tool is again moved away from the work piece; however, that in exceeding a maximum predetermined factor, by means of the stored value and/or by the reverse movement per time unit, the tool is moved away from the work piece and is maintained in this position until the scanning element determines a decrease of the distance between tool and work piece.

The maximum predetermined factor or value for each work piece may be determined here without difficulty from the maximum vertical difference of unevennesses of the surface; as soon as this value is exceeded, a work piece edge or a hole in the work piece has certainly been reached accordingly, and by means of the regulator, the level of the work piece set before the reverse movement is again moved along on/in a most favorably simple manner by the counter-guiding of the correcting element.

As soon as sensing element and tool have been moved from the area of a recess or along an edge to the next work piece as a result of a further advance of the tool parallel to the work piece surface, a signal corresponding to the distance is again emitted by the sensing element.

It is therefore advantageous when the signals emitted by the sensing element are differentiated during the guidance over a hole. In an approach of the opposite edge of the hole and in the changing of the sensing element signal, it may be determined immediately thereby when the spacing regulation must again be activated. As a practical matter, this may be realized simply when in the reversal of direction as a result of exceeding of the predetermined maximum value and in the stopping of the correcting element, the regulator is switched off and maintained is a deactivated state until the differentiation of the sensing signal shows an approach of the tool to the work piece.

The determination of an edge or of a recess may be measured advantageously both by direct determination of the path which the tool travels toward the work piece as well as indirectly with respect to correcting elements with a constant variable control rate (synchromotors) in that upon initiation of the movement directed toward the work piece, a time-measuring device is activated. As soon as the time-measuring device has achieved a predetermined time interval and it is thereby established that the work piece would have to be moved toward the work piece beyond a maximum value, the driving direction of the correcting element is advantageously reversed here, and said element is again moved away from the work piece during a time corresponding to the measured time span at the same rate of speed as in the forward movement and then is stopped. In this manner, the originally maintained level of the tool—prior to the reverse movement directed into a recess—is achieved again equally reliably.

Insofar as the tool advance occurring parallel to the work piece surface takes place at a variable speed, the path traveled in this connection can no longer be determined reliably by measuring the time necessary for a reverse movement. It is advantageous, therefore, when the maximum value, at which the directional change of the correcting element is effected, is changed depending on the advance and reverse speed.

This is achieved by the insertion of an integrating element into the regulating switch which determines the path by means of a voltage proportional to the path.

The invention may be realized exceptionally advantageously when, with a correcting element controllable by impulses and adjustable in proportion to the impulse count for the determination of the path directed toward the work piece, the impulses are counted and when, upon exceeding a maximum value, the correcting element is affected by driving impulses in the opposite direction for such a period of time until the number of impulses accumulated during the movement directed toward the work piece is achieved. Here, the use of a forward and backward-counting device is significant.

To the extent that analog signals are employed for the guidance of the correcting element, it is recommended to integrate and to store these signals during the guidance directed toward the work piece, and upon exceeding the maximum value to feed such amplitude with analog signals to the correcting element until the integral of these signals achieves the previously stored value. A so-called sample and hold switch is particularly suited for this purpose.

As the sensing element and the comparator, particularly suitable is a switching arrangement, wherein the distance between sensing element and work piece is incorporated as a frequency-determining element into an oscillatory circuit and the comparator is formed as a discriminator. As soon as the frequency corresponding to the specified distance is achieved, said frequency corresponding to the center frequency of the discriminator, the discriminator no longer emits a signal to the regulator connected at the outlet side, so that the correcting element stops. The influence of the oscillatory circuit frequency may be inductive or capacitive in this connection as this is known and customary in various specific embodiments.

Figure 2:
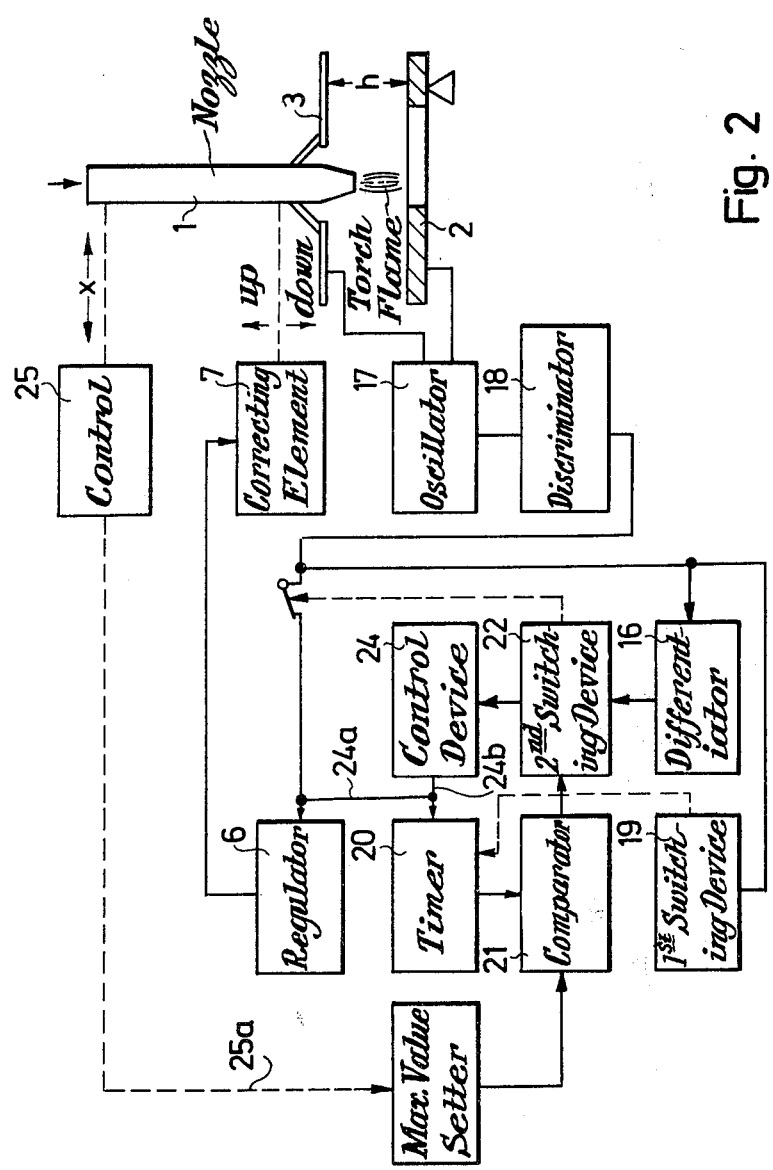
Figure 3:
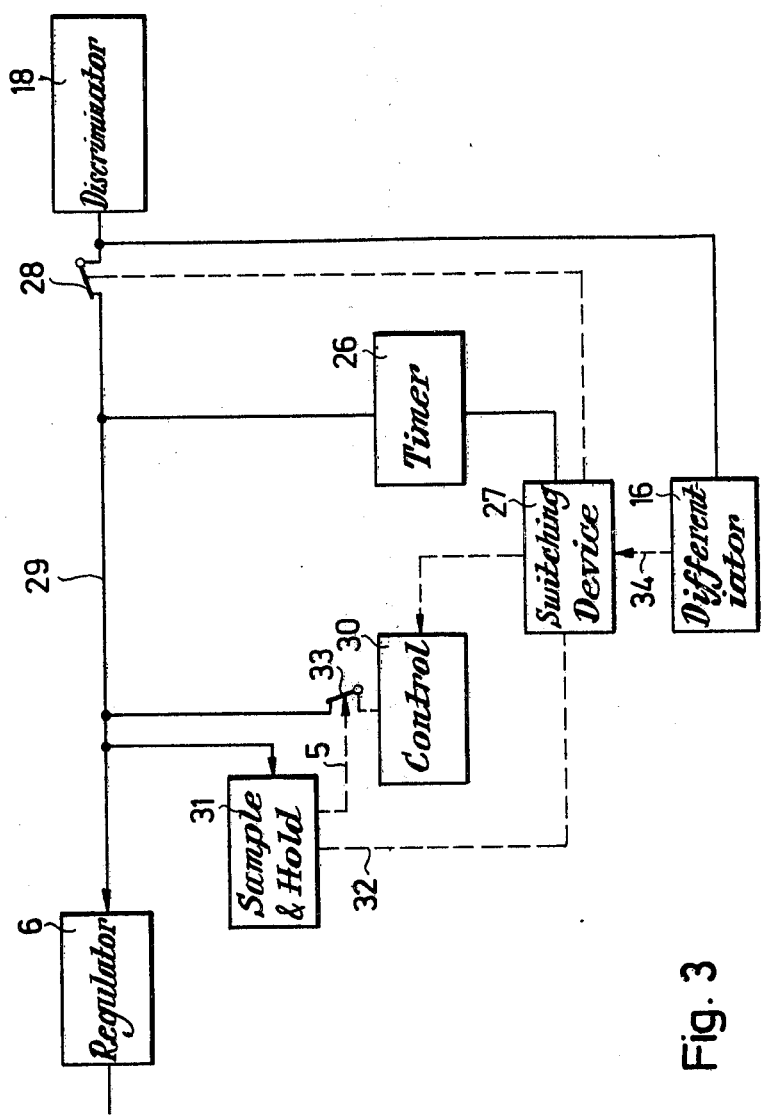

Novel features and advantages of the present invention will become apparent to one skilled in the art from a reading of the following description in conjunction with the accompanying drawings wherein similar reference characters refer to similar parts and in which:

FIG. 1, a block schematic of a regulating device with the characteristics of the invention:

FIG. 2, a block schematic of another regulating device of the invention with discriminator and time-measuring device; and FIG. 3 a further regulator of this invention with discriminator and sample and hold switch.

As illustrated schematically in FIG. 1, torch 1 of a torch-cutting device is moved by means of a non-illustrated control in the X or lateral direction over a steel plate 2. A sensing element 3 continuously determines the distance between torch 1 and steel plate 2 and emits sensing signals to regulator 6 by means of a signal modulator 4 and a comparator 5 in such a manner that said regulator maintains constant, by the effects of correcting signals on a correcting element 7, the present distance $h$ required for the cutting process even with unevennesses of the steel plate. The magnitude of the distance $h$ is adjustable by setting means 9, similarly connected to comparator 5.

In the area of a recess 8 in the steel plate 2, the sensing element 3 emits a signal to the comparator 5, which causes regulator 6 to emit correcting signals to correcting element 7 effecting an approach of torch 1, However, since even on reducing the distance $h$ in the area recess 8, a signal cannot be emitted by sensing element 3 to effect a reversal of the direction of movement of the correcting element, torch 1 would be completely lowered by the correcting element 7 into recess 8 and in a further movement in the X direction would be destroyed on the opposite edge of recess 8.

In order to avoid such a destruction, the output of regulator 6 is connected to a measuring device 10, which is activated on a movement directed toward the work piece and detects the extent of the deflection by means of correcting element 7.

The value stored in the measuring device 10 is again cancelled by a resetting device 11 as soon as regulator 6 has emitted correcting signals to the correcting element 7, the signals corresponding to a distance of torch 1 from steel plate 2. However, as soon as the value stored in measuring device 10 exceeds a predetermined factor stored in a maximum value setter 12, the latter activates a switching and control device 13. This interrupts, by means of a switch lead 14 and switch 15, the correcting signals emitted by regulator 6 to correcting element 7. At the same time, the switching and control device 13 emits opposite signals to correcting element 7 until the factor stored in the measuring device 10 is achieved quantitatively and consequently torch 1 is again situated on the level switched on prior to the reverse movement. As soon as this is achieved, by means of resetting device 11, the measuring device 10 is set at zero by switching and controlling device 13, while switch 15 remains still in its open position.

When, in a continuation of the advance in the X direction, the torch 1 reaches edge 2a of steel plate 2, the signal emitted by sensing element 3 is changed. The differentiating element 16, switched on at the signal modulator 4, is thereby activated, guiding the switching and control arrangement 13 in such a manner that switch 15 is again closed.

In this manner, the guidance of the correcting element 7 is immediately taken over again by regulator 6 on approaching edge 2 and even before the jet of torch 1 itself reaches edge 2a, the preset distance $h$ is adjusted.

In this connection, the measuring device 10 can determine indirectly the advance of correcting element 7 by means of impulse counting but also to store directly the output signals of regulator 6. By setting the maximum value setter 12 to the extent of unevennesses 2b to be expected on steel plate 2, it is possible to determine without difficulty and reliably the zero point of operating range for the switching and controlling device 13.

To the extent the measuring device 10 is provided for storing the correcting signals emitted from regulator 6, it may have a sample and hold switch or an impulse counter for the storing, depending on whether the correcting signals are emitted analogously or as an impulse sequence by regulator 6. Adapting the maximum value setter, switching and control device and resetting device to these requirements individually is possible for one skilled in the art without great difficulties and need therefore not be mentioned in greater detail here. The same holds true for the differentiator 16 and the control circuit, consisting of sensing element 3, signal modulator 4, comparator 5, regulator 6 and correcting element 7, which are known and used in the most diversified specific embodiments and may be bought also in finished component parts.

FIG. 2 shows a regulator, which is similarly equipped with sensing element 3, regulator 6 and correcting element 7. For the obtainment of the sensing signals, there is attached to sensing element 3 and steel plate 2 an oscillator 17 in whose circuit the capacity between steel plate 2 and sensing element 3 is incorporated as a frequency-determining element. Each change in distance between steel plate 2 and sensing element 3 therefore leads to a proportional change of the frequency of oscillator 17, so that the output voltage of a discriminator 18 switched at the output side to oscillator 17 fluctuates accordingly.

Discriminator 18 is so set that its output voltage becomes zero as soon as the frequency of oscillator 17 reaches a value which corresponds to the desired distance $h$ between sensing element 3 and steel plate 2.

Discriminator 18 is connected to a first switching device 19, which activates a timing circuit 20 on an output signal, which corresponds to a movement of torch 1 towards steel plate 2, and with a signal of opposite polarity again deactivates the timing circuit 20.

As soon as timing circuit 20 has reached a value which corresponds to the value advanced by maximum value setter 12 before a deactivation signal by the first switching device 19, a second switching device 22 is activated by a comparator 21. This switching device thereupon interrupts the connection between discriminator 18 and regulator 6 by opening switch 23 and furthermore activates control device 24. This emits signals of opposite polarity to regulator 6 by means of connecting lead 24a, so that by means of a respective guidance of correcting element 7, torch 1 is removed from steel plate 2 upon exceeding the maximum value. By means of connecting lead 24b, the duration of the signals emitted by control device 24 is supervised by timing circuit 20, so that upon achieving the value reached during the reverse movement by means of comparator 21 and the second switching device 22, the control device 24 is again turned off and torch 1 is stopped thereby on the level maintained prior to the reverse movement.

To the output of discriminator 18 is connected, furthermore, a differentiating element 16—according to the exemplary embodiment of FIG. 1—which on an approach of the sensing element to edge 2a activates the second switching element 22, so that switch 23 is again connected and regulator 6 returns to its function.

By a respective adjustment of the maximum value setter 12, the value of the movement directed toward the steel plate may be determined at which the regulating function of the circuit is deactivated.

In the exemplary embodiment illustrated, the advance of torch 1 is adjustable in the X direction by control 25. In order to make the reversal of torch 1, on an exceedingly far departure toward the steel plate, dependent not only on the absolute value of the deflection but also on the angle of the lowering, control 25 is connected by means of control lead 25a with the maximum value setter 12 in such a manner that the maximum value in lowering and reverse is adjusted to be proportional to the speed in the X direction.

FIG. 3 shows a regulating switch with discriminator 18 and regulator 6. Analogous to the exemplary embodiment of FIG. 2, a timer 26 determines the time span expired during a lowering movement of torch 1, and upon reaching a maximum value set in timer 26, activates a switching device 27, which opens a switch 28 in the connecting lead 29 between regulator 6 and discriminator 18. By means of switching device 27, a control device 30 is simultaneously activated giving off signals to regulator 6 which effect a removal of the correcting element 7 or of torch 1 from steel plate 2. Connected to the connecting lead 29 is a sample and hold switch 31, which stores the output signals of discriminator 18, which in turn effect a reverse movement of torch 1. As soon as switching device 27 and control device 30 are activated by timing device 26, the signals emitted by control device 30 equally reach the input of the sample and hold switch 31. These signals have reversed polarity, just as the signals emitted by discriminator 18 during the reverse movement, and gradually raise the value stored in the sample and hold switch 31. As soon as the value has dropped to zero, which corresponds to a raising of torch 1 by the same value as the preceding lowering, a switch 33 is opened by the sample and hold switch 31 by way of a control lead 32, so that the control device 30 is separated from the regulator input. Since at this point the switch 28 is still in its open position, no more signals reach the input of regulator 6 until an approach to edge 2a is determined by the differentiator 16 and by way of switching lead 34 the switching device 27 is activated, which again closes switch 28 and allows the regulating effect of the switch to start again.

Obviously, with this exemplary embodiment, the exceeding of a predetermined maximum factor or value could be achieved, instead of indirectly by the timer 26, also directly by comparison by the value stored in the sample and hold switch 31 with respect to a movement directed toward the steel plate 2 with a theoretical value.

In place of the indirect diversion of the course traveled by a torch, it is of course also possible guide the tool toward the work piece not from correcting signals but to provide a separate sensing element for path measurement. For example, by means of a transmitter, which is mechanically connected with the nozzle drive, to produce impulses, which, as in the exemplary embodiments and in an analogous switching, are transmitted to a counter. A potentiometer may also be advantageously coupled with the correcting element or the electromotive force of a correcting element motor or of a tachometer generator may be integrated and added.

I claim:

1. A regulating process for the carrying out the process for maintaining substantially constant the distance of a tool from a work piece to be processed having an uneven surface over which the tool is moved parallel to the surface, particularly for the distance regulation of the torch of a torch-cutting device from the work piece, the tool distance being determined by a sensing element, compared with the desired factor and the thus-determined deviation fed to a regulator, which, depending on this, emits regulating signals to a correcting element, which shifts the tool toward the work piece or away from the work piece, depending on the direction of the deviation, characterized in that in the initiation of a movement of the correcting element directed toward the work piece, the course of the tool to the correcting element is accumulatively determined, that the accumulated value is compared with the predetermined maximum factor, on exceeding the predetermined maximum factor, the tool is stopped and then is moved by in accordance with the predetermined maximum factor again away from the work piece and is maintained in this position until the sensing element determines a decrease of the distance between tool and work piece.

2. A process of claim 1, characterized in that the movement of the tool toward the work piece is timed, that upon reaching a predetermined maximum time value factor, the direction of drive of the correcting element is reversed and is moved away from the work piece during a time corresponding to the predetermined measured time value factor at the same rate of speed as in the forward movement and then is stopped.

3. A process of claim 1, characterized in that in the reversal of direction and in the stopping of the correcting element, the regulator is switched off and maintained in a deactivated state until the differentiation of the sensing signal shows an approach of the tool to the work piece.

4. A process of claim 1 with speed-variable tool advance parallel to the work piece surface, characterized in that the predetermined maximum factor, at the attainment of which the tool is moved away from the work piece by the correcting element is changed depending on the advance speed and the reverse speed.

5. A process of claim 1 with a correcting element controllable by impulses and adjustable in proportion to the impulse count, characterized in that the impulses are counted during a guidance of the correcting element directed toward the work piece to obtain the maximum predetermined factor, and that upon exceeding the maximum predetermined factor the correcting element is affected with driving impulses in the opposite direction for such a period of time until the number of impulses accumulated during the movement toward the work piece to obtain the maximum predetermined factor has been reached.

6. A process of claim 1 with correcting element controllable by analog signals and deflectable in proportion to the signal duration and/or signal amplitude, characterized in that the analog signals are integrated and stored during the guidance of the correcting element directed toward the work piece to obtain the maximum predetermined factor, and that upon exceeding the maximum predetermined factor, the correcting member is fed in the opposite direction analog signals of such amplitude until the maximum predetermined factor accumulated and stored during the movement toward the work piece has been achieved.

7. A device for maintaining substantially constant the distance of a tool from a work piece to be processed having an uneven surface over which the tool is moved parallel to the surface, particularly for the distance regulation of the torch of a torch-cutting device from the work piece, the tool distance being determined by a sensing element, compared with the desired factor and the thus-determined deviation fed to a regulator, which, depending on this, emits regulating signals to a correcting element, which shifts the tool toward the work piece or away from the work piece, depending on the direction of the deviation, by means of a regulating circuit having a sensing element, comparator, regulator and correcting element, characterized in that connected to the regulator output, parallel to the correcting element, is a measuring device for determining and storing the correcting signals, that the measuring device is connected to a comparator for determining the maximum predetermined factor, which in turn with a switching device for separating the correcting element from the regulator and for feeding to the correcting element the correcting signals of reversed driving direction corresponding to the stored maximum predetermined factor, is connected with the correcting element.

8. A device of claim 7 characterized in that the output of the comparator is connected to the first-mentioned switching device, which, for the activation of a time measuring device on the occurrence of signals corresponding to an approach of the tool to the work piece, is connected to the latter, that the measuring device in turn is connected with a comparator connected with a maximum predetermined factor setter, and that the comparator is connected to a second switching device for the opening of a switch in the connecting lead between comparator and regulator and for activating a control device connected with the input of a regulator upon the achievement of the maximum predetermined factor.

9. A device of claim 8, characterized in that the output of the comparator is connected to a differential element whose output is mounted at the second switching device in such a manner that on the initiation of a signal picked up by the differentiating element corresponding to an approach between tool and work piece, the switch between comparator and regulator is again closed.

10. A device of claim 8 with a guidance for changing the speed of the tool advance occurring parallel to the work piece, characterized in that the guidance for the reverse proportional adjustment of the maximum predetermined factor setter is connected with it on changes of speed.

11. A device in accordance with claim 7 wherein an oscillatory circuit is provided and the frequency of the oscillatory circuit is determined by the distance of sensing element and work piece, characterized in that the comparator is constructed and arranged as a discriminator whose output signals are directed to the input of the regulator.

* * * * *